Aug. 7, 1928.
L. KIRSCHBRAUN
1,679,475
PROCESS OF MAKING EMULSIONS AND PRODUCT THEREOF
Original Filed Aug. 21, 1922
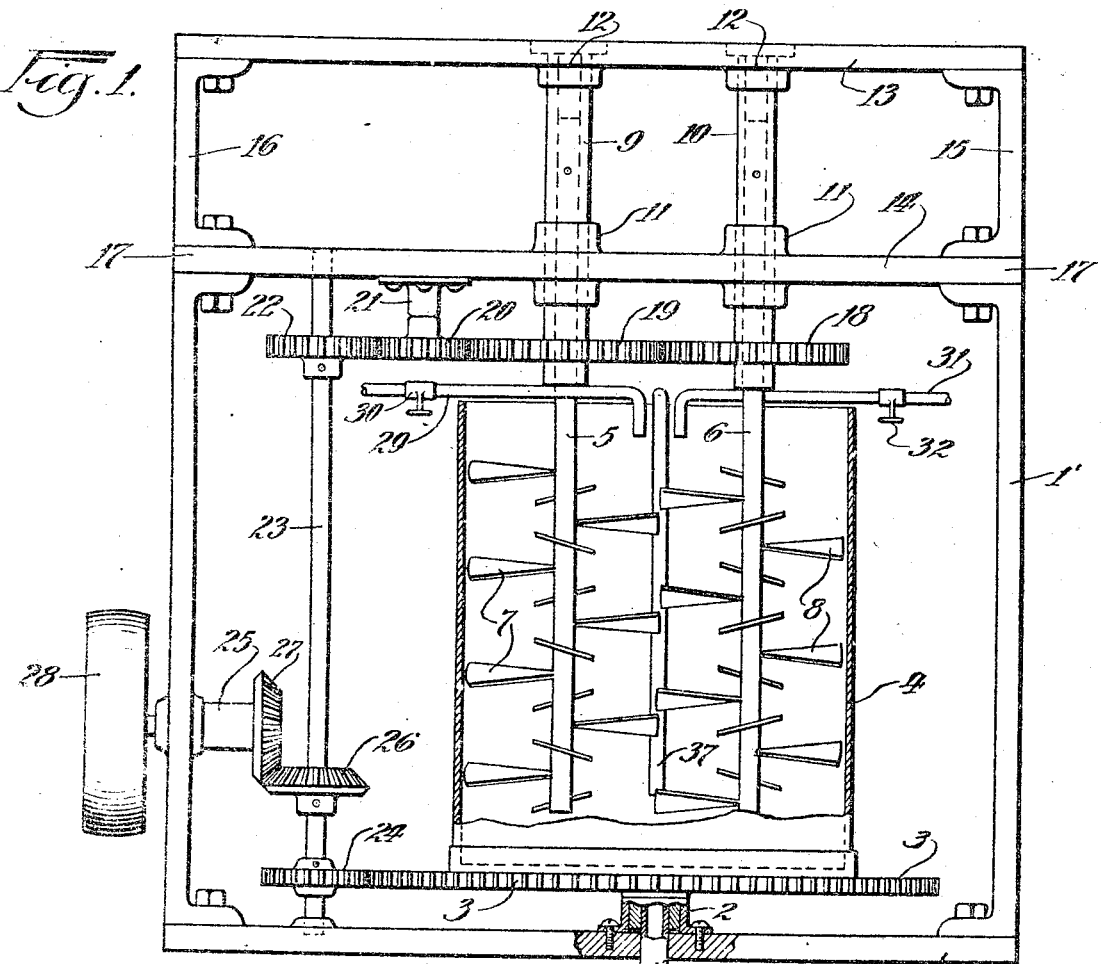

Patented Aug. 7, 1928.

1,679,475

UNITED STATES PATENT OFFICE.

LESTER KIRSCHBRAUN, OF LEONIA, NEW JERSEY.

PROCESS OF MAKING EMULSIONS AND PRODUCT THEREOF.

Original application filed August 21, 1922, Serial No. 583,407. Divided and this application filed March 24, 1926. Serial No. 96,965.

This is a division of my prior filed application, Serial No. 583,407, bearing filing date of August 21, 1922.

This invention relates to improvements in process and apparatus for making emulsions, and refers more particularly to bituminous emulsions which are miscible in water.

The invention is adapted particularly for making emulsions in which it is desirable or necessary to agitate a very stiff mass while the emulsion is being made.

The improved form of apparatus is shown in the accompanying drawing, in which Fig. 1 is a somewhat diagrammatic view, partly in side elevation and partly in vertical section, and Fig. 2 is a diagrammatic cross-sectional view of the agitator tank showing the blade arrangements and the manner of introducing the material.

Referring more particularly to the drawings, 1 designates the base on which is mounted a hollow trunnion 2 in which is mounted a large gear 3. This gear 3 carries a container or tank 4, which is fixed to rotate rigidly with the gear. In the tank 4 is a plurality of vertically extending rotating shafts, as for example, 5 and 6, carrying internesting blades 7 and 8, respectively, these blades being preferably pitched at an angle from the horizontal but so arranged that the blades on one shaft will clear the blades on the other as they rotate. The blades also closely approach the inner periphery of the cylindrically shaped can or tank 4 so as to tend to scrape off any material which might adhere to the sides. The upper ends of the shafts 5 and 6 are carried by the shaft extensions 9 and 10 mounted in suitable bearings 11 and 12, carried by the cross supporting arms 13 and 14, which arms are supported in the standards 15 and 16, the standards being detachably secured to the frame 1' as shown at 17, in any suitable manner, the idea being to be able to remove the blades for cleaning or replacement. To the shaft 6 is fixed a gear 18 which meshes with a gear 19 fixed in turn to the shaft 5. The gears 18 and 19 are driven through the idler gear 20 carried by shaft 21 and driving gear 22 fixed on the countershaft 23. This shaft 23 is suitably supported in the frame and in such a way as not to prevent the removal of the arm 17, or may be carried by another arm (not shown). Near the lower end of the shaft 23 is a gear 24, which meshes with the large gear 3. The shaft 23 is driven by the main shaft 25 through the bevel gears 26 and 27, and driving pulley 28.

The clay suspension hereinafter referred to may be introduced through the pipe 29 to the tank 4, which pipe is controlled by valve 30, and the asphalt in heated liquid condition may be introduced through the pipe 31, having the control valve 32. As seen in Fig. 2, the clay suspension or asphalt are introduced at that part of the tank where, at the point of entry, they do not come into direct contact with the blades. The result is that the material, particularly the asphalt, at the time of entry to the tanks, is not caught upon the blades and strung out, thereby interfering with the emulsifying operation.

The emulsion may be delivered through the hollow shaft 33 extending through a suitable opening in the base 1, the lower end of this delivery pipe 33 extending into a sleeve 34, which sleeve 34 is provided with a gate valve 35, thus controlling the delivery of the material to the receiving tank or drum 36. The tank may be heated by any suitable means, for example, live steam may be injected through the pipe 37 into the tank, the pipe being open at its lower end, or the tank may be surrounded by a closed steam coil (not shown) but obviously supported in a suitable manner.

In carrying out the process, dry bentonite or colloidal clay may be introduced into the tank 4 and then water added. The mass is then heated to a temperature of, say 120° F. Such amount of water is added so as to get a relatively thick mud. A continuous stream of asphalt in heated liquid condition, say, asphalt of 120 melting point, may then be added and also a continuous stream of water or bentonite or clay suspension in water. By means of the large gear, the tank itself will constantly and slowly rotate, carrying the asphalt into the sweep of the revolving blades or paddles while the paddles themselves, being driven from smaller gears, will rotate much faster. If desired, one of the shafts carrying one set of paddles may travel faster than the other. Preferably, in carrying out the process, the stock is permitted to build up until it is a substantial depth in the tank, after which it is maintained at said depth by constantly drawing off the finished material from the bottom. This makes a most effective emulsion miscible in water. I have found that such an emulsion can be made by this process and apparatus, in which the asphalt particles are so fine as to average .01 millimetres in diameter. It is to be understood that much higher melting point asphalts or other bitumens or pitches may be used, as for example, coal tar pitches, natural or artificial asphalts, and animal, vegetable or mineral pitches. Emulsions of the character described in my prior patents may be made in this way.

Furthermore, this apparatus is well adapted for making an emulsion of such a character that the finished product is of a much thinner consistency than is feasible to maintain during the emulsifying operation. For example, in the manufacture of paints, a relatively thick emulsion may be built up in the manner heretofore described, the gate valve 35 being closed. When the tank is partially filled with finished emulsion, the exact proportions of the bentonite, asphalt and water which are contained in the tank, being definitely known, water may then be added gradually, the mixture being continuously agitated, meanwhile, until the emulsion has been thinned down to the desired consistency suitable for paint or whatever use is desired.

In such case, for example, after a thick emulsion is made, it may consist of 15 parts of bentonite by weight, 300 parts of asphalt of about 120 melting point, and 110 parts of water. This then may be thinned down by adding, in the manner described, 50 more parts of water. An emulsion made with the above proportions and diluted as stated has been found very satisfactory for paint.

After the diluted batch has been made in the manner above stated, another batch may be made as follows: About, say, 90% of the diluted emulsion may be withdrawn at the bottom of the tank and 10% left in the tank. To this is added the dry bentonite and the mixture agitated with the remainder of the previous batch until the desired consistency is again attained. Asphalt, in heated liquid condition, is then added and the batch built up again as previously described and then again diluted. This makes a semi-continuous operation, which may continue indefinitely in this manner.

I claim as my invention:

1. A process of making an emulsion, consisting in mixing a colloidal emulsifying agent with such proportion of the end product of a previously prepared emulsion of the same general characteristics as to produce a paste, in subsequently adding thereto bituminous material in heated liquid condition, agitating, producing dispersion of the added bituminous material and thereby producing fresh emulsion.

2. A semi-continuous process of making emulsions, comprising first making a batch in which a heat liquefiable waterproofing material is dispersed in an aqueous vehicle containing a suspended emulsifying agent, in then removing a substantial portion of the batch, in then dispersing fresh quantities of heat liquefied waterproofing material by introducing regulated quantities of the ingredients producing the dispersion until a fresh batch has been made, and in intermittently interrupting the discharge of portions of the batch.

3. A semi-continuous process of making emulsions, comprising first making a batch in which a heat liquefiable waterproofing material is dispersed in an aqueuos vehicle containing a suspended emulsifying agent, in then removing a substantial portion of the batch, in then dispersing fresh quantities of heat liquefied waterproofing material by introducing regulated quantities of the ingredients producing the dispersion until a fresh batch has been made, and in intermittently interrupting the discharge of portions of the batch while fresh charges of ingredients are being dispersed.

LESTER KIRSCHBRAUN.